United States Patent Office 3,521,140
Patented July 21, 1970

3,521,140
DC MOTOR CONTROL SYSTEM
Kazutsugu Kobayashi, Kadoma-shi, and Hisayuki Matsumoto, Moriguchi-shi, Japan, assignors to Matsushita Electric Industrial Co., Ltd., Kadoma, Osaka, Japan
Filed Nov. 3, 1967, Ser. No. 680,408
Claims priority, application Japan, Nov. 9, 1966, 41/74,213, 41/74,215
Int. Cl. H02p 7/28
U.S. Cl. 318—331                                   4 Claims

ABSTRACT OF THE DISCLOSURE

A D-C motor control system comprising a bridge circuit, a reference voltage means, an amplifying means, a power supply, a power control transistor, a switch means and resistor circuits.

The amplifying means is connected to said bridge circuit and controls the electric conductivity of the power control transistor. The switch means selects said resistor circuits connected to the bridge circuit and makes it possible to change easily the settings of the rotational speed of said motor. The resistor circuits also compensate for the speed-torque characteristics and speed-supply voltage characteristics of the motor in the case of multi-speed setting.

FIELD OF THE INVENTION

This invention relates to electric systems for controlling the operation of a D-C motor, and more particularly it relates to a D-C motor control system which provides control of rotation of a D-C motor at a desired speed selected from the various predetermined speeds and reduces wow and flutter caused be changing the speed.

A recent development in the electronic industry has required a D-C motor capable of rotating at a constant speed regardless of any variation in the load or the power supply voltage. For instance, a tape recorder of a record player needs such a D-C motor as a driving means. Such a D-C motor is required to rotate at a substantially constant speed close to a predetermined speed regardless of any variation in the load or the voltage of the power supply. In many cases it is necessary that the speed be changeable. In a record player, for example, at least two settings of the motor speed are required corresponding to turn table speeds of 33⅓ r.p.m. and 45 r.p.m. A tape recorder also needs such changeable speed.

Said multiple speed setting type D-C motors referred to herein are those in which the desired motor speed can be selected from among a plurality of predetermined speeds by the control system attached to the D-C motor. For convenience, such selection action will hereinafter be referred to as "a change in the predetermined speed."

PRIOR ART

A D-C motor for use in an audio frequency reproduction system is required to be regulated so as to rotate at a constant speed regardless of a change in the load and the supplied voltage. One conventional method for regulating the speed is to use a mechanical governor utilizing centrifugal force having a pair of contacts which act as a current braking switch. A motor which is controlled by such a mechanical governor rotates at almost constant speed regardless of any variation in the load and the supply voltage but generates a large amount of electric noise. Therefore, the effect of the electrical noise on the audio frequency reproducing means must be prevented by using shielding devices and noise eliminating devices such as a shield case, resistors and capacitors. In spite of the use of such devices, the effect of the electric noise cannot be entirely eliminated.

Moreover, the setting of the speed is not easy, and the set speed varies with the wear of contacts during operation over a period of several hundred hours.

A conventional electric control circuit for a D-C motor comprises a bridge circuit in which the motor is included in one arm of it and is superior to the mechanical governor in its properties.

The conventional electric control circuit has no contacts which are apt to wear and makes it possible to drive a D-C motor at a constant predetermined speed. The predetermination of the speed by the use of the electric control circuit is theoretically easy but in practice is difficult due to the complicated construction of the circuit. A speed controlled D-C motor capable of rotating at a plurality of speeds is desirable for tape recorders, record players, etc. A D-C motor which rotates at a single speed setting has been successfully controlled by an electric control circuit using a bridge circuit modified at various points. However, multiple speed setting type motors have not been satisfactorily controlled due to the complexity of the circuits or defects in the characteristics of the circuits. Prior bridge circuit control systems have not been entirely satisfactory for use in controlling a multiple speed setting type D-C motor because they have inferior speed-torque characteristics, speed-supply voltage characteristics, and construction, and are difficult to mass produce.

SUMMARY OF THE INVENTION

An object of the present invention is to provide a D-C motor control system for a multiple speed setting type motor, which makes it possible for the motor to rotate at a desired constant speed selected from among the various predetermined speeds regardless of a variation in the load applied to the motor shaft or a variation in the supply voltage.

Another object of the invention is to provide a D-C motor control system for a multiple speed setting type motor, which when the motor speed is changed to a desired speed, holds the selected speed in a sure and certain manner.

A further object is to provide a D-C motor control system for a multiple speed setting type motor, which has a simple switching system.

These and other objects of the invention will be clear from the following detailed description taken together with accompanying drawings wherein.

A D-C motor control system according to the invention comprises a bridge circuit formed by the D-C motor and three resistors. An amplifying means is connected to said bridge circuit and controls the electrical conductivity of a power control transistor controlling the supply of power to the motor so that the motor rotates at a substantially constant speed at any predetermined speed.

A switch means connects one of a plurality of resistor circuits coupled across the bridge circuit. Said resistor circuits cause the motor to run at any of a number of available desired higher speeds and eliminates deterioration in the speed-torque and speed-supply voltage characteristics caused when the speed is changed to the desired higher speed.

DESCRIPTION OF THE PREFERRED EMBODIMENT

Figure 1:
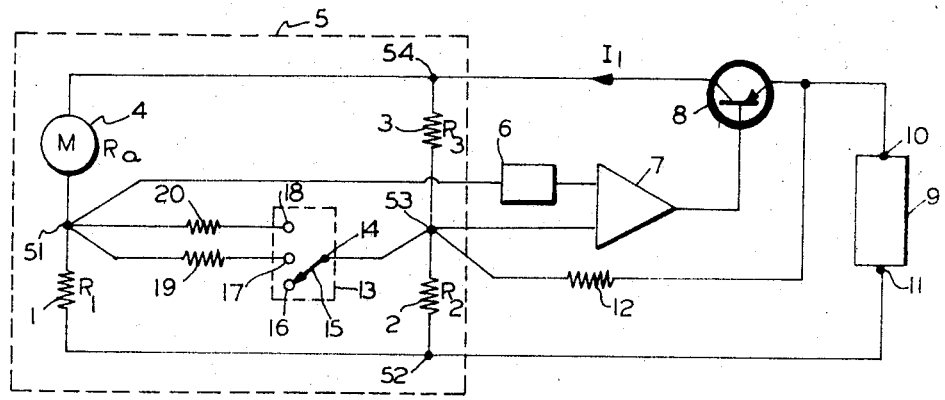
FIG. 1 is a circuit diagram of a first embodiment of the D-C motor control system according to the present invention.

Referring to FIG. 1, a bridge circuit 5 has, as one arm thereof, the armature winding of a D-C motor 4, and as the other arms a first resistor 1, a second resistor 2, and a third resistor 3. Said D-C motor 4, said first resistor 1, said second resistor 2 and said third resistor 3 are connected in a series circuit loop and in the recited order. Said D-C motor 4 comprises in addition to the armature having the winding thereon, a stator which is a magnet.

Since the flux density of the magnetic field of said stator is nearly constant, the back electromotive force (back E.M.F.) induced in said armature winding is nearly proportional to the rotational speed of the D-C motor. Therefore, when the back E.M.F. is regulated so as to have a constant value, the rotational speed of the armature is also controlled so as to be a substantially constant speed.

A first junction point 51 of said first resistor 1 and said D-C motor 4 is connected to one of a pair of input terminals of an amplifying means 7 through a reference voltage means 6. A third junction point 53 of said second resistor 2 and said third resistor 3 are connected directly to the other input terminal of said amplifying means 7.

The output terminal of said amplifying means 7 is connected to the base of a power control pnp type transistor 8. The emitter of the power control transistor 8 is connected to one terminal 10 of a power supply 9 and the collector of said transistor 8 is connected to a fourth junction point 54 of said third resistor 3 and said D-C motor 4. The other terminal 11 of said power source 9 is connected to a second junction point 52 of said first resistor 1 and said second resistor 2.

The voltage $E_b$ appearing between said first junction point 51 and said third junction point 53 can be calculated as follows:

$$E_b = E_a \frac{R_1 + R_a}{R_a + R_1 + R_2 + R_3} \left[ + \frac{R_1 - R_2}{(R_1 + R_2)(R_a + R_1)} \left( \frac{R_a}{R_1} - \frac{R_3}{R_2} \right) \right] + I_1 \frac{R_1 \cdot R_2}{R_a + R_1 + R_a + R_3} \left( \frac{R_a}{R_1} - \frac{R_3}{R_2} \right)$$
(1)

wherein $R_a$ = the equivalent internal electric resistance of said D-C motor
$R_1$ = the electric resistance of said first resistor 1
$R_2$ = the electric resistance of said second resistor 2
$R_3$ = the electric resistance of said third resistor 3
$E_a$ = the back electromotive force of said D-C motor 4
$I_1$ = the current applied between said second junction point 52 and said fourth junction point 54.

When the resistance of each of the arms of the bridge circuit 5 is according to the following equation;

$$\frac{R_a}{R_1} = \frac{R_3}{R_2}$$
(2)

Equation 1 can be written as follows:

$$E_b = E_a \frac{R_1 + R_2}{R_a + R_1 + R_2 + R_3}$$
(3)

Generally, $R_a$ and $R_1$ are negligibly small compared with $R_2$ and $R_3$. Under such conditions Equation 3 can be written as follows:

$$E_b = E_a \frac{R_2}{R_2 + R_3}$$
(4)

Equation 4 indicates that the voltage $E_b$ is independent of the current $I_1$ and is proportional only to the voltage $E_a$. Voltage $E_b$ is compared with the reference voltage $E_r$ of said reference voltage means 6 so as to produce an error voltage, $E_r - E_b$ which is amplified by said amplifying means 7.

The current flowing in the bridge circuit 5 from the power supply 9 corresponds to the collector current $I_1$ of the transistor 8. The bridge circuit 5 is constructed so that most of the collector current flows through the D-C motor 4. This current flowing through the D-C motor 4 is controlled by changing the base current of the transistor 8. When the D-C motor 4 is loaded and has a rotating speed lower than the predetermined speed, the back E.M.F. decreases and $E_r - E_b$ becomes greater so that the input voltage to the amplifying means 7 increases.

An increase in the input voltage to said amplifying means 7 results in an increase in the current flowing through the base, the collector and the D-C motor 4 successively, and vice versa. Accordingly, the torque generated varies with the variation in current through said D-C motor 4. Such variation brings the rotating speed close to the predetermined speed.

When the supply voltage of said power supply 9 varies due to a variation in the internal electric impedance of said power supply 9, the base current of the transistor 8 varies slightly depending on the characteristic of the transistor. Since the gain i.e. the ratio of input voltage to output current of the amplifying means 7 is practically finite, the deviation in the base current of said transistor 8 results in a deviation in the input voltage to said amplifying means 7. The deviation in the input voltage results in a deviation of the rotational speed of said D-C motor 4 from its predetermined speed.

The regulation of the speed of the D-C motor 4 with a variation in the supply voltage of the power supply 9 in this way is not entirely satisfactory. The regulation can be improved by using a resistor 12 connected between the third junction point 53 and the one terminal 10 to the power supply 9.

In this case, the supply voltage of the power supply 9 increases (or decreases), with a consequent increase (or decrease) in the current flowing through the resistor 12. The voltage appearing at the second resistor 2 also increases (or decreases) which results in an increase (or decrease) in the input voltage of said amplifying means 7 without changing the back E.M.F. and the speed of said D-C motor 4. Therefore, the speed of the D-C motor 4 is satisfactorily regulated regardless of variation in the supply voltage of the power supply 9. The speed-supply voltage characteristic curve can be made extremely flat in the predetermined range of the supply voltage by selecting a proper resistance value for the resistor 12. The resistance value of said resistor 12 is about 10 times to about 100 times that of said second resistor 2. Since the resistor 12 makes the bridge circuit 5 slightly unbalanced, the value of the second resistor 2 or third resistor 3 should be slightly modified depending on the resistance value of the resistor 12.

A change in the predetermined speed of the D-C motor 4 can be carried out by changing the voltage of the reference voltage means. However, many economical and available reference voltage means, for example, Zener diodes, cannot have the voltage appearing across their terminals changed easily. A change in the predetermined speeds can also be achieved by changing the resistance value of the first resistor 1, the second resistor 2 and the third resistor 3 even when the reference voltage is not changed. Such a method, however, requires a change in the resistance of at least two resistors in said bridge circuit 5, i.e. a combination of said first resistor 1 and said second resistor 2 or a combination of the first resistor 1 and the third resistor 3. In addition, the balance of said bridge circuit 5 must be adjusted for each speed of a plurality of predetermined speeds. This is very troublesome and expensive.

These difficulties have prevented development of an economical means for changing the predetermined speed of the D-C motor. A simple and reliable means for changing the predetermined speeds of a D-C motor can be provided in the following manner in accordance with the invention.

Referring again to FIG. 1, a switch means 13 comprising a common terminal 14, a selecting arm 15, selecting terminals 16, 17 and 18 is provided for changing the predetermined speeds of the D-C motor 4. The predetermination of each of the speeds of said D-C motor 4 can be easily achieved by employing respectively a resistor 19 and a resistor 20.

Said common terminal 14 is connected to the third junction point 53. Said resistor 19 is connected between said first junction point 51 and said selecting terminal 17. Said resistor 20 is connected between said first junction point 51 and said selecting terminal 18.

When the selecting arm 15 is positioned at the selecting terminal 16, the operation of the system is the same as described hereinbefore. The speed of said D-C motor 4 is established by the characteristic of the D-C motor, the first resistor 1, second resistor 2, third resistor 3 and the voltage of the reference voltage means 6.

The first junction point 51 and the third junction point 53 are shunted by the resistance of the said resistor 19 when the selecting arm 15 is positioned at the selecting terminal 17. The equivalent internal impedance of said bridge circuit 5 taken across the first junction point 51 and the third junction point 53 is nearly equal to the impedance of a parallel connected second resistor 2 and third resistor 3, when the resistor 19 is absent. Therefore, the voltage appearing across the first junction point 51 and third junction point 53 is attenuated by the impedance of the resistor 19. The balance of the bridge circuit 5 is not disturbed by the resistor 19, in that the balance is held even in the presence of the resistor 19. The voltage appearing across the first junction point 51 and the third junction pont 53 is proportional to the back E.M.F. of the motor 4 and is attenuated by the factor of $$\frac{R_4}{R_4 + \frac{R_2 \cdot R_3}{R_2 + R_3}}$$

where $R_4$ is the resistance value of the resistor 19. Since the voltage appearing across the first junction point 51 and third junction point 53 is regulated so as to have a value almost equal to the voltage appearing across the reference voltage means 6, the speed of the D-C motor increases to an extent corresponding to the attenuation by the resistor 19. The factor by which the speed is multiplied by the resistor 19 is $$1 + \frac{\frac{R_2 \cdot R_3}{R_2 + R_3}}{R_4}$$

The predetermination of the speed is accomplished by giving the proper resistance value to the resistor 19.

The resistor 20 acts in the same manner as the resistor 19 and makes possible still another predetermined speed of said D-C motor 4.

Thus an arbitrary number of $n$ predetermined speeds of D-C motor can be obtained by employing a switch means having $n$ selecting terminals and $n$ or $n-1$ resistors in accordance with the invention.

Figure 3:
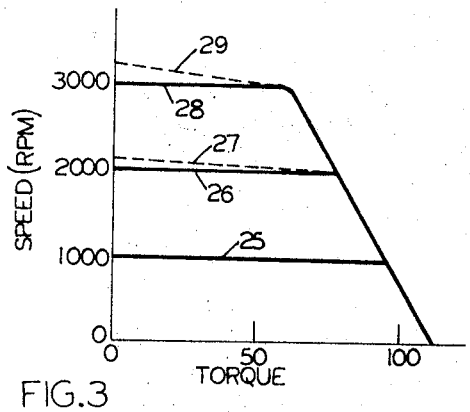
FIG. 3 is a graph illustrating curves of the speed-torque characteristics of a D-C motor having a control system according to the present invention.
Figure 4:
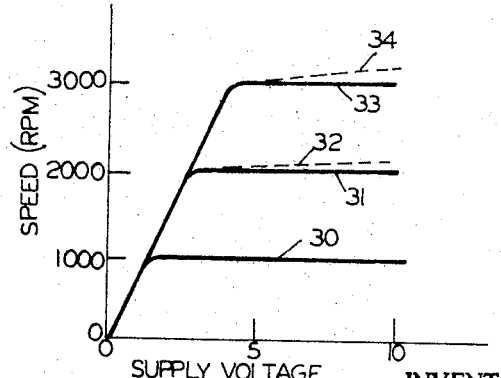
FIG. 4 is a graph illustrating curves of the speed-supply voltage characteristics of a D-C motor having a control system according to the present invention.

Representative characteristics obtained by the system of FIG. 1 are shown by curves 25, 27 and 29 of FIG. 3 and curves 30, 32 and 34 of FIG. 4.

The speed-torque characteristic curve 25, curve 27 or curve 29 of FIG. 3 corresponds to the cases in which the selecting arm 15 of said switch means 13 is positioned at the selecting terminals 16, 17 or 18, respectively.

As shown in FIGS. 3 and 4, the uniformity of speed with respect to the loading torque and supply voltage is not entirely satisfactory for higher predetermined speeds. The unsatisfactory nature of the characteristic is due to the fact that the voltage-current gain of said amplifying means 7 is of a finite value which is responsible for the origination of an offset voltage at its input, which corresponds to the variation of the base current of said power transistor 8.

These characteristics are not satisfactory for a motor for use in an audio frequency reproduction instrument such as a tape recorder or a record player. An improvement in the characteristics can be achieved by employing an additional four resistors in accordance with the invention.

Figure 2:
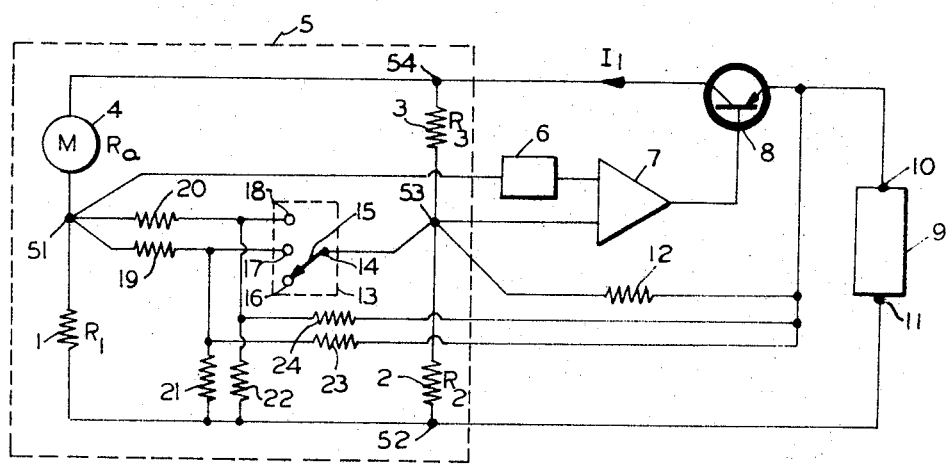
FIG. 2 is a circuit diagram of a second embodiment of the D-C motor control system according to the present invention.

Referring to FIG. 2, components having reference numbers the same as those of FIG. 1 are the same as those of FIG. 1 and are connected in the same way as in FIG. 1. A resistor 21 is connected between the second junction point 52 and the selecting terminal 17 of said switch means 13. A resistor 23 is connected between the emitter of said power transistor 8 and said selecting terminal 17. A resistor 22 is connected between said second junction point 52 and the selecting terminal 18 of said switch means 13. A resistor 24 is connected between the emitter of said power transistor 8 and said selecting terminal 18.

When the selecting arm 15 of said switch means 13 is positioned at the selecting terminal 17, said second resistor 2 is connected in parallel with the resistor 21 and the resistor 12 is connected in a parallel with the resistor 23. The resistors 20, 22, and 24 have current flowing therein, but have practically no effect on the bridge circuit 5 because the resistance value of said first resistor 1 is negligible compared with the resistance values of resistors 20, 22 and 24.

The resistor 21 which is in parallel with the second resistor 2 makes the bridge circuit slightly unbalanced.

The resistance value $R_2$ in the Equation 1 must be replaced by a resistance value $R_2'$ which is the resistance value of the parallel connected second resistor 2 and resistor 21. The resistance value $R_2'$ is smaller than $R_2$. When the value $R_2$ is replaced by $R_2'$ in the Equation 1, the second term of the right hand side of the Equation 1 becomes negative and is proportional to the current $I_1$. The voltage $E_b$ appearing across said first junction point 51 and said third junction point 53 decreases proportionally with an increase in the current $I_1$ even when the back E.M.F. of said D-C motor 4 remains at a constant value. The voltage $E_b$, however, is regulated so as to have a value almost equal to the voltage appearing across the terminals of reference voltage means 6 in this control system. Therefore, as the current $I_1$ increases, the back E.M.F. $E_a$ increases so that it becomes the same as voltage $E_b$. Because the bridge circuit 5 is constructed so that the most of the current $I_1$ flows through the D-C motor 4, the back E.M.F. increases proportionally with an increase in the current flowing through the D-C motor 4. Since the current of said D-C motor 4 is proportional to the load torque and the back E.M.F. is proportional to the speed of said D-C motor 4, the speed of the motor increases in proportion to the load torque. Therefore, the resistor 21 can compensate for the decrease in the speed with an increase in the load torque as shown in the curve 26 of FIG. 3. The resistance values of said resistors 21 and 22 are about 2 times to about 100 times the resistance value of said second resistor 2. The resistor 23 is in parallel with the resistor 12 and lowers the resistance value of the impedance which is connected between said third junction point 53 and the emitter of said power transistor 8 and which compensates the speed-supply voltage characteristic of the system. It is necessary that the resistance values of said resistors 23 and 24 be about ⅓ to about 10 times that of said resistor 12. When the selecting arm 15 of said switch means 13 is positioned at the selecting terminal 18, the resistor 22 compensates the speed-torque characteristic and the resistor 24 compensates the speed-supply voltage characteristic.

A representative characteristic obtained by using the resistors 21, 22, 23 and 24 in FIG. 2 is shown in FIG. 3 and FIG. 4. Curves 25 and 30 correspond to the case in which the selecting arm 15 is positioned at the selecting terminal 16. Curves 26 and 31 correspond to the case in which the selecting arm 15 is positioned at the selecting terminal 17. Curves 28 and 33 correspond to the case in which the selecting arm 15 is positioned at the selecting terminal 18.

What is claimed is:

1. A permanent magnet D-C motor control system comprising a D-C motor armature winding, a first resistor, a second resistor and a third resistor connected in a series circuit loop and in the recited order, said circuit loop constituting a bridge circuit; a reference voltage means; an amplifying means having a pair of input terminals and an output terminal, one terminal of said pair of input terminals being connected to a first junction point of said D-C motor armature winding and said first resistor through said reference voltage means and the other input terminal being connected to a third junction point of said second resistor and said third resistor; a power supply having a first terminal and second terminal, said second terminal being connected to a second junction point of said first resistor and said second resistor; a power control transistor having a base connected to said output terminal of said amplifying means and the emitter-collector path connected between said first terminal of said power supply and a fourth junction point of said D-C motor armature winding and said third resistor; a fourth resistor connected across said third junction point and said first terminal of said power supply; a switch means having a common terminal, a selecting arm and a plurality of selecting terminals, said common terminal being connected to the said third junction point, and a plurality of speed selecting resistors, one for each selecting terminal, said selecting terminals being connected to said first junction point through the respective speed selecting resistors.

2. A permanent magnet D-C motor control system as claimed in claim 1, further including compensating resistors connected across the respective selecting terminals of said switch means and said second junction point.

3. A permanent magnet D-C motor control system as claimed in claim 1, further including compensating resistors connected across the respective selecting terminals of said switch means and said first terminal of said power supply.

4. A permanent magnet D-C motor control system as claimed in claim 1, further including a first plurality of compensating resistors connected across the respective selecting terminals of said switch means and said second junction point, and a second plurality of compensating resistors connected across the respective selecting terminals of said switch means and said first terminal of said power supply.

References Cited
UNITED STATES PATENTS

| | | | |
|---|---|---|---|
| 2,689,320 | 9/1954 | Aloisio | 318—331 X |
| 2,799,818 | 7/1957 | Brown | 318—331 X |
| 3,229,182 | 1/1966 | Kubler | 318—331 |

ORIS L. RADER, Primary Examiner

T. LANGER, Assistant Examiner